May 10, 1955   P. E. PRUTZMAN   2,708,086
BRACKET FOR MOUNTING REAR VIEW MIRRORS
Filed Jan. 12, 1952   2 Sheets-Sheet 1
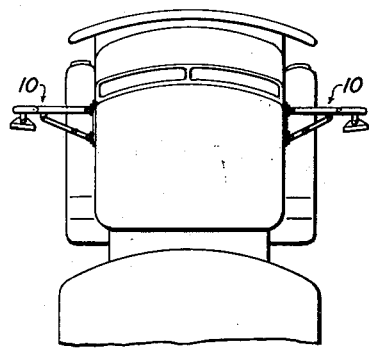
FIG.1
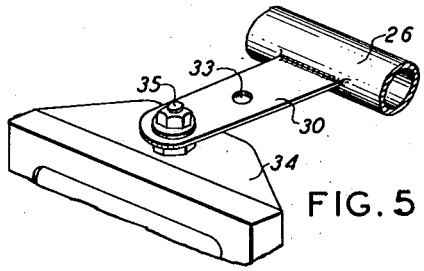
FIG.5
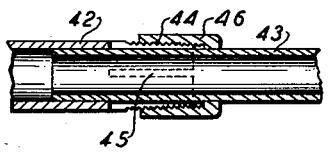
FIG.9
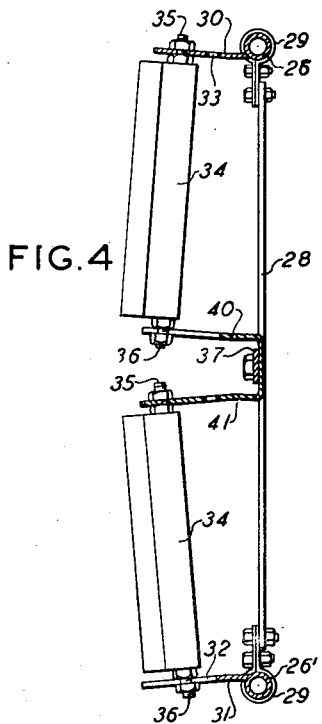
FIG.4
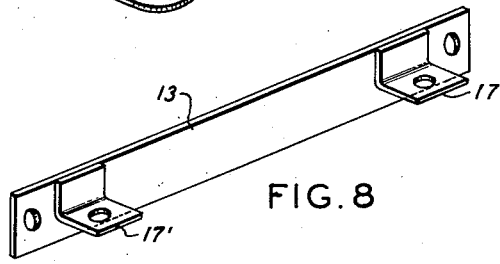
FIG.6
FIG.7
FIG.8
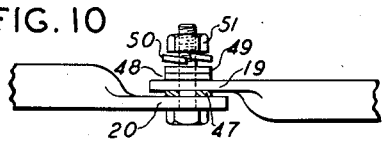
FIG.10
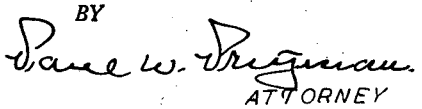
INVENTOR.
PAUL E. PRUTZMAN
BY
ATTORNEY INVENTOR.
PAUL E. PRUTZMAN
BY
*Dane W. Prutzman*
ATTORNEY

United States Patent Office 2,708,086
Patented May 10, 1955

2,708,086

BRACKET FOR MOUNTING REAR VIEW MIRRORS

Paul E. Prutzman, South Gate, Calif.

Application January 12, 1952, Serial No. 266,232

12 Claims. (Cl. 248—205)

This invention relates to a bracket adapted to be attached to the cab of an automotive truck and to support a mirror or mirrors in such position that the driver may view the road to the side and rear of the vehicle.

A purpose of the invention is to provide a bracket which is inherently stiff and free from tendency to vibrate either vertically or horizontally.

A purpose of the invention is to provide a bracket which may be adjusted to any desired angle to the fore-and-aft line of the truck.

A purpose of the invention is to provide a bracket which may, without substitution of parts, be positioned on either side of the truck.

A purpose of the invention is to provide a bracket assembly of which the elements are readily assembled and readily separable for shipment in a package of small compass.

A purpose of the invention is to provide a bracket capable of adjustment as to extent of projection and adapted to be used on trucks having differing degrees of overhang of body.

A purpose of the invention is to provide a bracket on which a single mirror may be mounted to swivel and to tilt to desired angles by independent adjustments.

A purpose of the invention is to provide a bracket on which two mirrors may be mounted in superposition and adjusted independently to different angles and inclinations, thus materialy increasing the field of vision of the operator of the vehicle.

A purpose of the invention is to provide a bracket which is automatically collapsible and which will retract to clear an obstacle without damage to mirror, bracket or the wall of the vehicle.

These and other advantages of the invention will be evident on inspection of the attached drawings, showing an illustrative embodiment thereof, in which Fig. 1 is a diagram, in plan, of the forward end of a heavy duty truck, illustrating the normal positioning of the brackets on the two sides of the vehicle;

Fig. 4 is a side elevation of the bracket, showing two mirrors adjusted to different inclinations, as on the line 4—4 of Fig. 3;

Fig. 5 is an isometric view of the upper end, and Fig. 6 a similar view of the lower end of a mirror, showing the supports on which the mirror is swivelled to a desired angle and tilted to a desired inclination;

Fig. 7 is an isometric view of the central yoke 37 of Fig. 4, used when two mirrors are to be mounted on the same bracket;

Fig. 8 is a similar view of the base strap 13 of Fig. 2, by which the bracket is attached to the side of the truck cab;

Fig. 9 is a detail, in section, of a suggested means for rendering certain elements of the structure adjustable in length, and Fig. 10 is a detail, in section, of a preferred form of pivotal joint adapted to afford sensitive control over resistance to pivotal movement.

Figure 2:
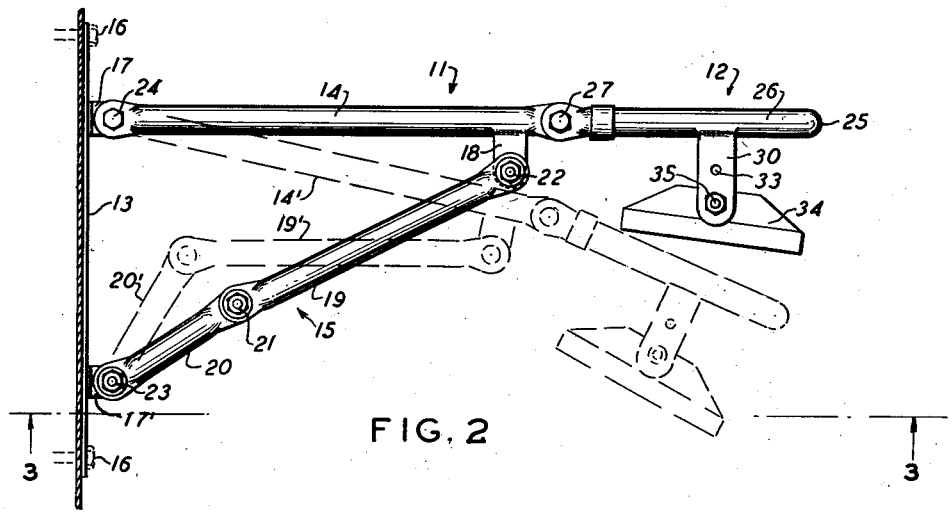
Fig. 2 is a plan view of the right hand bracket, illustrating particularly the collapsing means.
Figure 3:
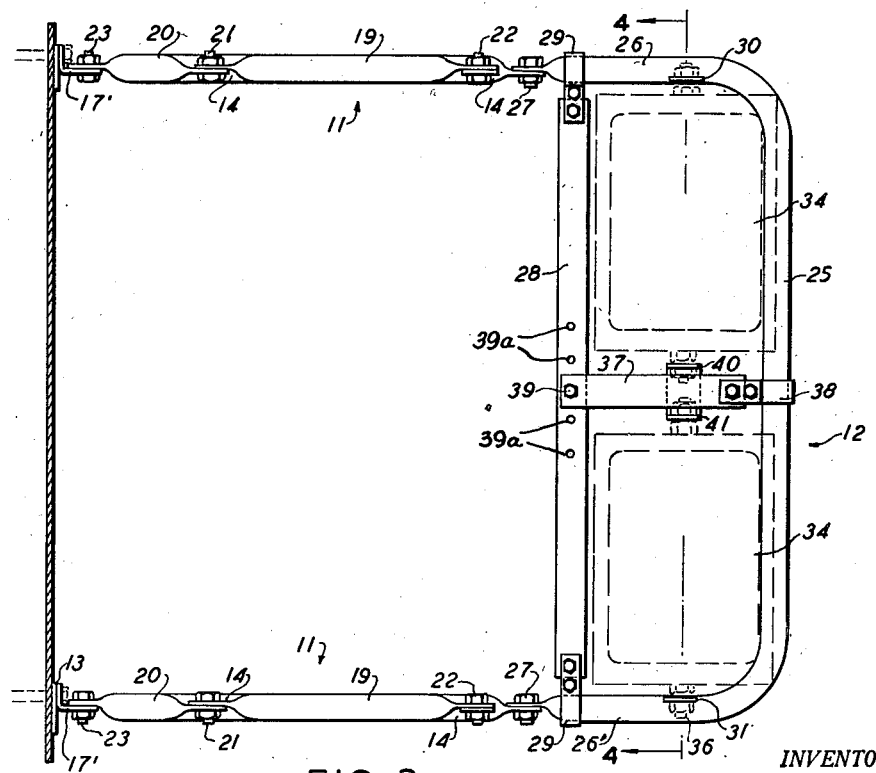
Fig. 3 is an elevation of the bracket viewed from the rear, as on the line 3—3 of Fig. 2.

Referring first to Figs. 1, 2 and 3, each bracket as generally indicated at 10—10 comprises two supporting assemblies 11—11 projected horizontally from the wall of the cab in vertically spaced relation, together with a mirror-supporting U-frame 12 connecting the outer ends of these assemblies.

Each supporting assembly 11 consists of a base strap 13, an extension rod 14 and a brace rod generally indicated at 15. The base strap is adapted to be attached to the wall of the cab, usually the door, by bolts 16—16 or by welding. Perforate lugs 17—17' are projected from the strap at points adjacent its ends.

The extension rod 14 carries a perforate lug 18 projected rearwardly and the brace rod 15 connects this lug with the rearward lug 17' on the base strap. If the collapsing feature later described is to be omitted from the design, this rod may be a single piece, the length of the brace rod as related to the spacings between lugs 17 and 18 and between lugs 17 and 17' determining the angle to the line of travel of the truck at which the bracket projects from the cab. By varying the length of this rod the bracket may be caused to project in a line normal to the axis of the truck, or forward or back of that line, as may be most desirable in any individual installation.

If the collapsing feature later more fully described is to be incorporated in the design, the brace rod generally indicated at 15 is composed of two sections 19 and 20, pivotally connected at 21 and initially out of alignment in the horizontal plane. In either case the above recited elements are linked to the corresponding lugs, at points 22, 23 and 24, by pivot pins which will usually take the form of through bolts, the ends of the rods being flattened and the nuts associated with such bolts providing means for varying the pressure with which mating surfaces engage and the consequent resistance to pivotal movement of one element on the other.

The rods 14 and 15 or 19—20 may be of any inherently stiff section, such as angle, T or channel, but I find the best relation of stiffness to weight in the use of light steel tubing, the ends of the tubes being pressed flat or swaged so as to be flat on one side only. If any section other than tubing is used, the flange is removed from the web for a short distance from each end, to provide a flat projection for linkage.

The U-frame 12 may be of material of any desired section but is preferably formed from tubing bent to provide a vertical element 25 and two horizontal elements 26—26'. The ends of the latter are flattened and are pivotally connected with the ends of extension rods 14 (upper and lower) as at 27—27, the pivot pin or bolt being provided with locking means such as a threaded nut. These elements are connected at points adjacent their outer ends by a tie bar 28, which is preferably clamped to the tubing as at 29—29 to permit the spacing of the tie bar from vertical element 25 to be varied. The horizontal members 26—26' are further provided with rearwardly directed lugs 30—31, for the attachment of the mirror or mirrors, the lower lug 31 being slotted as at 32 and the upper lug 30 having at least two perforations 33.

Referring now to Figs. 3, 4, 5 and 6, the ends of the mirror casing 34 are provided with vertical studs 35—36, each carrying a lock nut. The lower stud 36 passes through slot 32, the upper stud 35 through one or the other of perforations 33.

The inclination of the mirror is adjusted by shifting the position of lower stud 36 in slot 32. The flexibility required in the lugs is only that which will permit the inclination of the mirror to be varied through a few degrees without straining the studs. The angular position of the mirror is adjusted by loosening the locknuts and swivelling the mirror on the studs.

The above description applies to the mounting of a single mirror extending substantially the length of the U-frame. The same devices are used for mounting two mirrors in superposition as illustrated in Figs. 3 and 4. For this purpose a crossbar 37 is extended between vertical frame element 25 and the tie bar 28, the crossbar being preferably clamped to element 25, as at 38 and bolted to the tie bar as at 39. The clamp 38 may be loosened temporarily to permit the crossbar 37 to be shifted vertically through a range of selected positions to accommodate mirrors of different vertical dimensions. A series of bolt holes 39a in the tie bar 28 are provided to receive the bolt 39 selectively for holding the crossbar 37 at desired positions of vertical adjustment.

A yoke bolted to the crossbar as shown in Fig. 7 carries two rearwardly projected lugs 40—41, the upper of which is slotted and the lower perforated. These lugs are aligned with lugs 30—31 and the half-length mirrors are bolted to the four lugs in the general manner above described, the upper mirror between lugs 30 and 40 and the lower mirror between lugs 31 and 41. Thus the two mirrors are independently adjustable both for angle and for inclination.

The mirror assembly of which fragments are shown in Figs. 5 and 6 is that described in my copending application Serial No. 140,669, filed January 26, 1950, this form having an enclosing case containing a heating element. Any preferred form of mirror may be used, however, by providing it with vertical studs such as 35—36 on which the mirror may swivel and may be locked in the desired angular position.

An optical modification of the above structure lies in the provision of means for varying the length of the extension rod or of the brace rod or, preferably, of both. Various devices may be used for this purpose but I prefer to utilize the conventional telescoping tube and clamp illustrated in Fig. 9. In this device the rod (14 or 15, if rigid, or one of the sections 19 or 20 if the brace rod be collapsible) consists of two lengths of tubing of sizes which telescope neatly, as at 42—43 in this figure. The end of the outer tube is provided with a fine, slightly tapered thread 44 and is slitted as at 45. A sleeve 46 having an internally tapered thread is used to clamp the outer to the inner tube after the rods have been brought to the desired lengths, as will be described.

Another minor modification of the structure, useful only in case it is desired that the bracket should be collapsible, is the modified pivot pin illustrated in Fig. 10, suggested for use at points 22, 23 and 24 of Fig. 2 but particularly useful at points 21 and 27.

As will later be described, it is highly desirable that the bracket should collapse, i. e., fold back toward the truck cab if an obstacle should be encountered. In this collapsing movement, U-frame 12 swivels on pins 27—27 as indicated by broken outlines 12' and 31', and/or sections 19—20 of the brace rod fold as indicated at 19'—20' by swivelling on pin 21 and on pins 22—23, while extention rod 14 swivels on pin 24 as indicated at 14'. By these movements the outer end of the assembly is retracted toward the cab and permitted to pass the obstacle without damage, the extent of this retracting movement depending on the relative lengths of the various parts concerned.

Normally the elements above named are fully extended and the friction between the mating faces of the flattened ends of the rods must be sufficient to maintain them in fixed position during long periods of use, while the frictional resistance must be low enough to permit movement when an obstacle is encountered. This rather delicate adjustment is possible but difficult to make with the simple bolt and nut combination shown at the pivot points in Fig. 3, and the purpose of the device shown in Fig. 10 is primarily to increase the sensitiveness of this adjustment by interposing a stiffly resilient element. A further purpose is to prevent contact of mating faces of ferrous metal, such as the flattened rod ends and the under side of the nut which, without such protection, might rust together immovably on long exposure to the weather.

Referring to Fig. 10, 19 and 20 are the flat ends of the sections of brace rod 15 and 21 is the bolt shown at that point in Figs. 2 and 3. Between the mating faces of 19 and 20 I place a nonrusting washer 47 and a similar washer 48 is placed between the upper face of 20 and a plain iron washer 49. A spring washer or open stiff spring 50 is placed over the plain washer, and finally the adjusting and lock nut 51.

The washers 47 and 48 may be of any nonferrous metal such as aluminum or copper, or preferably, a soft metal such as lead, or they may be punched from a sheet of a synthetic resin, or they may consist of an oil-saturated, absorbent sheet material such as leather or paper board. The provision of these washers ensures that the collapsing movement will take place when required, by excluding moisture from the swivel joint and preventing contact between ferrous metal surfaces.

The structure above described has important advantages over mirror-supporting brackets heretofore known, particularly in the following respects:

(a) It is completely free from tendency to vibrate in a horizontal plane, by reason of the use of the brace rod, and is rendered free from vibration in a vertical plane by the truss effect of the U-frame.

(b) It is readily attached to the vehicle by an unskilled worker, no tools being required other than wrenches and means for drilling through the door.

(c) It folds together or may be disassembled for shipping in a compact package, a major advantage over brackets of which the parts are permanently joined and which ordinarily are highly unwieldy.

(d) It is reversible and may be used on either side of the truck without substitution of parts. In changing from one side to the other the extension rod and the U-frame are rotated through 180° to cause the lugs to project rearwardly.

(e) The mirror may be brought to the most favorable fore-and-aft position on the particular vehicle by varying the relative lengths of the brace rod and the extension rod. This best position can usually be found only by experiment after the mirror has been installed, and the extent and completeness of vision may often be materially improved by a relatively slight backward or forward shift. This adjustment is best made with the use of the extensible brace rod of Fig. 9 though it may also be made by the substitution of a nonextensible rod of different length.

(f) A completely universal bracket may be produced by making the lengths of both the extension rod and the brace rod adjustable, or by providing each of these rods in a variety of lengths for substitution. Individual trucks vary widely in overhang of body beyond cab, and the best lateral position for the mirror varies accordingly.

(g) The mounting of the mirror to swing and to tilt independently facilitates placing it in the best angular position by permitting one angle, once found, to be maintained while the other is being located. In the use of the universal joint, as in ordinary practice, this adjustment is difficult because of the necessity of finding both angles at the same time. The described mounting means also provides for locking the mirror in the adjusted positions without risk of the subsequent shifting which often occurs when the mirror is mounted on a single universal joint.

(h) The preferred use of two mirrors, one above the other and independently adjustable for the two angles, affords a better and more complete rear and side view than can be had with the use of a single mirror of any form of face. In the general terms, one mirror is set to give the best view of the road to the rear of the vehicle, the other to view the road immediately alongside and for a shorter distance to the rear. The blind spot which is inseparable from the use of a single mirror is thus entirely avoided and the risk otherwise incurred in making a shift from lane to lane disappears.

(i) A highly important advantage of the bracket of the invention is in its feature of collapsibility. The mirrors used on trucks must extend well beyond the line of the truck body and, even with careful driving, often strike or are struck by objects toward which they are moving. In the use of rigidly projected brackets, such collisions not only destroy the bracket and often the mirror assembly but are highly likely to tear the bracket away from the cab, causing an expensive repair. It is modern practice to increase pay load by forming the cab and its doors of metal too thin to withstand any serious stress without tearing.

Such damages are avoided, in the instant structure, by making the bracket automatically collapsible at either or both of two points, so that if struck it will fold inwardly without damage to itself or to the cab.

If the collision is with the extremity of the bracket, i. e., with any part of the U-frame, this element will swivel rearwardly on pins 27—27, the frame and the mirrors carried by it thus riding past the obstruction without damage. In the much less likely event that the collision occurs while the truck is backing the frame will swivel forwardly without damage to the bracket or cab though sometimes with damage to the mirror assembly, which is located back of the U-frame.

If the collision is with a portion of the bracket inboard from joint 27, the extension rod is forced back and the sectional brace rod folds as already described, retracting the end of the extension rod until it passes the obstacle, after which the U-frame is encountered and swivels rearwardly until clear. The sectional brace rod 19—20 may fold inwardly, as shown in Fig. 2, or outwardly, and the deviation from alignment of the two sections, in the normal operating position, should not be less than 5° and may well be greater.

(j) A further important advantage of the invention also relates to collapsibility of the described structure in response to the impact against obstacles as the truck moves forward. This further advantage is that the U-frame serves as a guard to protect the mirror or mirrors mounted thereon against direct impact against obstacles. Thus, as can be seen in Fig. 3, the U-frame extends laterally outward beyond both of the two mirrors and also extends above and below the two mirrors so that both mirrors are completely guarded against forward impact. If any roadside obstacle extends into the path of the two mirrors as the truck moves forward, the U-frame rather than the mirrors will strike the obstacle and, of course, the U-frame is less vulnerable to impact damage than the two mirrors.

(k) The fact that the crossbar 37 is vertically adjustment is advantageous in making the mirror arrangement readily adaptable for service with high efficiency on different types of trucks. To meet this situation, it is desirable to use a relatively long upper mirror angled for observation to the rear of the truck and a relatively short lower mirror at an angle for viewing the road immediately alongside the truck.

I claim as my invention:

1. An adjustable rear view mirror mount for installation on the side of the cab of a motor truck, comprising: a pair of upper and lower extension members, each adapted at one end for attachment to the cab; a corresponding pair of brace members each connected at its outer end to the outer end portion of the corresponding extension member and adapted at its inner end for attachment to the cab laterally of the point of attachment of the corresponding extension member; a frame pivotally connected to the outer ends of said two extension members to swing about an upright axis relative to the extension members; and two vertically spaced pivot means on said frame to support a mirror rearward thereof at an adjustable angle relative thereto.

2. A mirror mount as set forth in claim 1 in which at least one of said vertically spaced means is adjustable relative to said frame to vary the inclination of the mirror forward or rearward with respect to the frame.

3. A mirror mount as set forth in claim 2 in which said frame is connected to the extension members by pivot means at the inner edge of the frame to permit said frame to respond to collision with obstacles by swinging bodily to a position completely rearward of said extension member.

4. A mirror mount as set forth in claim 1, which includes a pair of base straps connected both with the ends of the corresponding extension members and with the ends of the corresponding brace members to adapt said members for attachment to the cab.

5. Means for mounting a rear view mirror on the side of the cab of a motor truck, comprising: a pair of upper and lower extension members, each adapted at its inner end for attachment to the cab; a corresponding pair of brace members, each connected at its outer end to the outer end of the corresponding extension member and adapted at its inner end for attachment to the cab; a frame pivotally connected to the outer ends of said extension members to swing about an upright axis relative to the extension members; a pair of vertically spaced pivot means for supporting a mirror on said frame, at least one of said pivot means being movable to adjustably incline the mirror forward or backward, said pivot means being positioned on said frame to hold said mirror rearwardly thereof and completely in the path of the frame as the truck moves forward so that the frame will serve as a guard to protect the mirror against impact against obstacles in the path of the mirror.

6. An adjustable mount for installation of a pair of rear view mirrors on the side of the cab of a motor truck comprising: a pair of vertically spaced base members for attachment to said cab; a corresponding pair of brace members each connected at its outer end to the outer end of the corresponding extension member and connected at its inner end to the corresponding base member laterally of the corresponding extension member; a frame pivotally connected to the outer ends of said extension members to swing about an upright axis relative to the extension members; an upper pair of vertically spaced pivots and a lower pair of vertically spaced pivots for mounting said two mirrors respectively on said frame for rotation about upright axes, at least one pivot of each pair being adjustable for adjustable inclination of each mirror relative to said frame whereby said two mirrors may be positioned at different angles of inclination relative to the vertical to view different portions of the roadway.

7. An adjustable mount for installation of a rear view mirror on the side of the cab of a motor truck, comprising: a pair of upper and lower extension members; a corresponding pair of brace members, each pivotally connected to the outer end of the corresponding extension member, each of said brace members having two longitudinal sections movable relative to each other for variable extension of the brace member; a base member for pivotally attaching the inner ends of said extension members and the inner members of said brace members to the cab with the pivotal attachments of the brace members spaced rearward on the cab from the pivotal attachments of the extension members; and vertically spaced pivot means on said frame to pivotally support a mirror thereon for rotation about an upright axis, at least one of said pivot means being movable for adjustably inclining the mirror relative to the frame.

8. A mirror mount as set forth in claim 7 in which the two sections of each of said brace members are pivotally connected together for relative angular movement so that the brace members may have normal angular configurations to permit them to collapse by folding action thereby to permit extension members to fold back toward the cab in response to impact against obstacles in the course of forward movement of the truck.

9. A mirror mount as set forth in claim 8 which includes variable pressure means at the pivotal interconnections of the two sections of each of the brace members for variable resistance to relative angular movements of the two sections.

10. Means for mounting a rear view mirror on the side of the cab of a motor truck, comprising: pair of upper and lower extension members; a corresponding pair of rearward brace means, each having two pivotally interconnected sections movable through a range of angles relative to each other so that the brace means may have a normal angular configuration to permit it to collapse, the outer ends of said brace means being pivotally connected to the corresponding outer ends of said extension members; a pair of base members adapted for mounting on the cab, said base members having forward pivotal connections with the inner ends of the corresponding extension members and rearward pivotal connections with the inner ends of the corresponding brace means; a frame pivotally mounted on the outer ends of said extension members; a pair of vertically spaced pivot means on said frame positioned to support said mirror rearward from said frame and entirely within the path of the frame as the vehicle moves forward whereby obstacles in the path of the mirror will strike said frame rather than the mirror and rotate the frame relative to said extension members to carry the mirror out of its normal path.

11. An adjustable mount for installing a pair of upper and lower mirrors on the side of the cab of a motor truck, comprising: a mounting frame for attachment to the side of the cab; an upper member included in said frame, means on said upper member for pivotal engagement with the upper end of an upper mirror; a lower member included in said frame, means on said lower member for pivotal engagement with the lower end of a lower mirror; substantially vertical means interconnecting said upper and lower members; an intermediate member between said upper and lower members; and means on said intermediate member for pivotal engagement with the lower end of the upper mirror and pivotal engagement with the upper end of the lower mirror, said intermediate member being adjustable on said vertical means to accommodate upper and lower mirrors of different relative lengths.

12. An adjustable mount as set forth in claim 11 in which said pivotal engagement means are movable forward and rearward relative to said frame to tilt the mirror to various angles independently.

References Cited in the file of this patent

UNITED STATES PATENTS

| | | |
|---|---|---|
| 1,110,973 | Tischler | Sept. 15, 1914 |
| 1,584,938 | Higbee, Jr. | May 18, 1926 |
| 1,748,837 | Greensfelder | Feb. 25, 1930 |
| 1,751,567 | Wadsworth | Mar. 25, 1930 |